United States Patent
Foladare et al.

(10) Patent No.: US 6,603,973 B1
(45) Date of Patent: Aug. 5, 2003

(54) CALL REDIRECTION SYSTEM

(75) Inventors: Mark Jeffrey Foladare, Kendall Park, NJ (US); Shelley B. Goldman, East Brunswick, NJ (US); Gary Joe Grimes, Birmingham, AL (US); David Phillip Silverman, Somerville, NJ (US); Roy Philip Weber, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/920,203

(22) Filed: Aug. 15, 1997

Related U.S. Application Data

(63) Continuation of application No. 08/431,351, filed on Apr. 28, 1995, now abandoned.

(51) Int. Cl.[7] ................................................. H04Q 7/20
(52) U.S. Cl. ........................ 455/445; 455/414; 455/458; 455/461; 340/7.21; 379/211.01; 379/211.02
(58) Field of Search ............................... 455/31.2, 31.3, 455/413, 414, 417, 432, 435, 445, 458, 459, 461, 517; 379/210–212, 211.01, 211.02, 212.01; 340/7.1, 7.21, 7.22

(56) References Cited

U.S. PATENT DOCUMENTS

| | | | |
|---|---|---|---|
| 4,658,416 A | | 4/1987 | Tanaka ........................ 379/57 |
| 5,235,633 A | * | 8/1993 | Dennison et al. ............. 379/60 |
| 5,243,645 A | | 9/1993 | Bissell et al. ................ 379/211 |
| 5,375,161 A | * | 12/1994 | Fuller et al. .................. 379/57 |
| 5,440,614 A | | 8/1995 | Sonberg et al. ............... 379/60 |
| 5,446,553 A | * | 8/1995 | Grube .......................... 379/60 |
| 5,506,888 A | * | 4/1996 | Hayes et al. .................. 379/59 |
| 5,548,636 A | * | 8/1996 | Bannister et al. ............. 379/57 |

FOREIGN PATENT DOCUMENTS

| | | | |
|---|---|---|---|
| CA | 2117934 | 6/1995 | |
| WO | WO91/07838 | 11/1990 | .......... H04M/11/00 |

OTHER PUBLICATIONS

U.S. patent application, Ser. No. 08/129,795, filed Sep. 30, 1993, entitled "Incoming Communications Forwarding Technique Utilizing a Called Party Location Indicator" and assigned to the same assignee as the present invention.

* cited by examiner

*Primary Examiner*—Nay Maung

(57) ABSTRACT

A telephone network arranged to give a telephone call placed to a called party's personal telephone number a particular call treatment that is selected as a function of the particular one of a plurality of predefined areas in which the called party is determined to be located, each of the plurality of predefined areas having at least two telephone stations with different telephone numbers located therein. The location of the called party is determined from the location of a two-way pager associated with the called party as detected by a paging antenna, e.g., tower, of a conventional two-way paging system that was not necessarily installed for use in completing telephone calls. For each personal telephone number, a table is stored associating a call treatment with one or more of the areas. The particular call treatment associated with an area is applied to calls to the personal telephone number when he is within that area. The associations of particular call treatments with respective ones of the areas is under control of the called party. The particular call treatments may include: (a) routing of the call to a particular wired telephone located within the area; (b) routing the call to a particular wired telephone outside of the area, (c) routing the call to a particular wireless telephone, (d) routing the call to a sequence of wired and/or wireless telephones within or outside of the area until the call is answered, and (e) routing the call to an automated answering platform. A default treatment may also be stored for handling calls that are placed to the called party when the called party is not within any area for which a call treatment is associated.

29 Claims, 2 Drawing Sheets

CALL REDIRECTION SYSTEM

This application is a continuation of application Ser. No. 08/431,351 filed on Apr. 28, 1995 now abandoned.

TECHNICAL FIELD

This invention relates to the processing of telephone calls.

BACKGROUND OF THE INVENTION

It has been recognized in the art that many individuals who need to be communicated with are highly mobile. The prior art system of associating a telephone number with a particular telephone line at a particular location is inadequate to meet the needs of such highly mobile individuals. This inadequacy is partially overcome by a) call forwarding arrangements, including sequence routing of calls, b) mobile, e.g., cellular, telephones, and c) pagers, including two-way paging.

One prior art system addressing the needs of highly mobile individuals is disclosed in U.S. patent application, Ser. No. 08/129,795 entitled "Incoming Communications Forwarding Technique Utilizing a Called Party Location Indicator". In this system, calls are automatically forwarded by a private branch exchange (PBX) to a telephone that is located within close proximity of the called party, as indicated by the detected location of a two-way paging device on the person of the called party. In particular, receivers for determining the locations of called parties' two-way pagers are fixedly associated with particular telephones. When a call is received for a particular called party, a page is transmitted to the called party's pager. Based on the paging receiver receiving the response from the pager, a location of the pager is determined and the call is routed to the telephone that is determined to be closest to the called party. Disclosed variants of the system include 1) the ability to route the call to one or more alternate telephones that are close to the location of the called party if the telephone closest to the called party is busy, and 2) the ability to route the call to a voice messaging system if the call is not answered.

To implement such a system on a wide scale requires installation of a large infrastructure, a very costly undertaking. This is because of the need to install at least one paging receiver for each telephone to which the calls can be routed. The system is also limited because of the fixed nature of the relationship between the paging receivers and the telephones.

SUMMARY OF THE INVENTION

We have recognized that we can obtain benefits similar to those obtained by the Grimes et al. system but with considerably less investment and over a very wide area, e.g., nationwide. In accordance with the principles of the invention, a telephone network is arranged to give a telephone call placed to a called party's personal telephone number a particular call treatment that is selected as a function of the particular one of a plurality of predefined areas in which the called party is determined to be located, each of the plurality of predefined areas having at least two telephone stations with different telephone numbers located therein. In accordance with an aspect of the invention, the associations of particular call treatments with respective ones of the areas is under control of the called party. Thus, calls to each called party receive customized call treatments. These call treatments need not be the same, even when the called parties are located in the same particular one of the areas. Moreover, the areas may be defined on a called party-by-called party basis.

The particular call treatments for association with one or more areas may include: (a) routing of the call to a particular wired telephone located within the area; (b) routing the call to a particular wired telephone outside of the area, (c) routing the call to a particular wireless telephone, (d) routing the call to a sequence of wired and/or wireless telephones within or outside of the area until the call is answered, and (e) routing the call to an automated answering platform. A default treatment may also be stored for handling calls that are placed to the called party when the called party is not within any area for which a call treatment is associated.

In a particular embodiment of the invention, the location of the called party is determined from the location of a two-way pager associated with the called party as detected by a paging antenna, e.g., tower, of a conventional two-way paging system that was not necessarily installed for use in completing telephone calls. For each personal telephone number, a table is stored which contains the information to associate one or more of the areas with a particular call treatment. The particular call treatment associated with an area is applied to calls to the personal telephone number when he is within that area.

In another embodiment of the invention, the location of the called party is determined from a global positioning system (GPS) receiver which is connected to, or incorporated in, the two-way pager associated with the called party. The areas would be defined by GPS coordinates rather than by paging tower location. Thus, the areas may be defined independent of the location of the paging towers.

DETAILED DESCRIPTION

Figure 1:
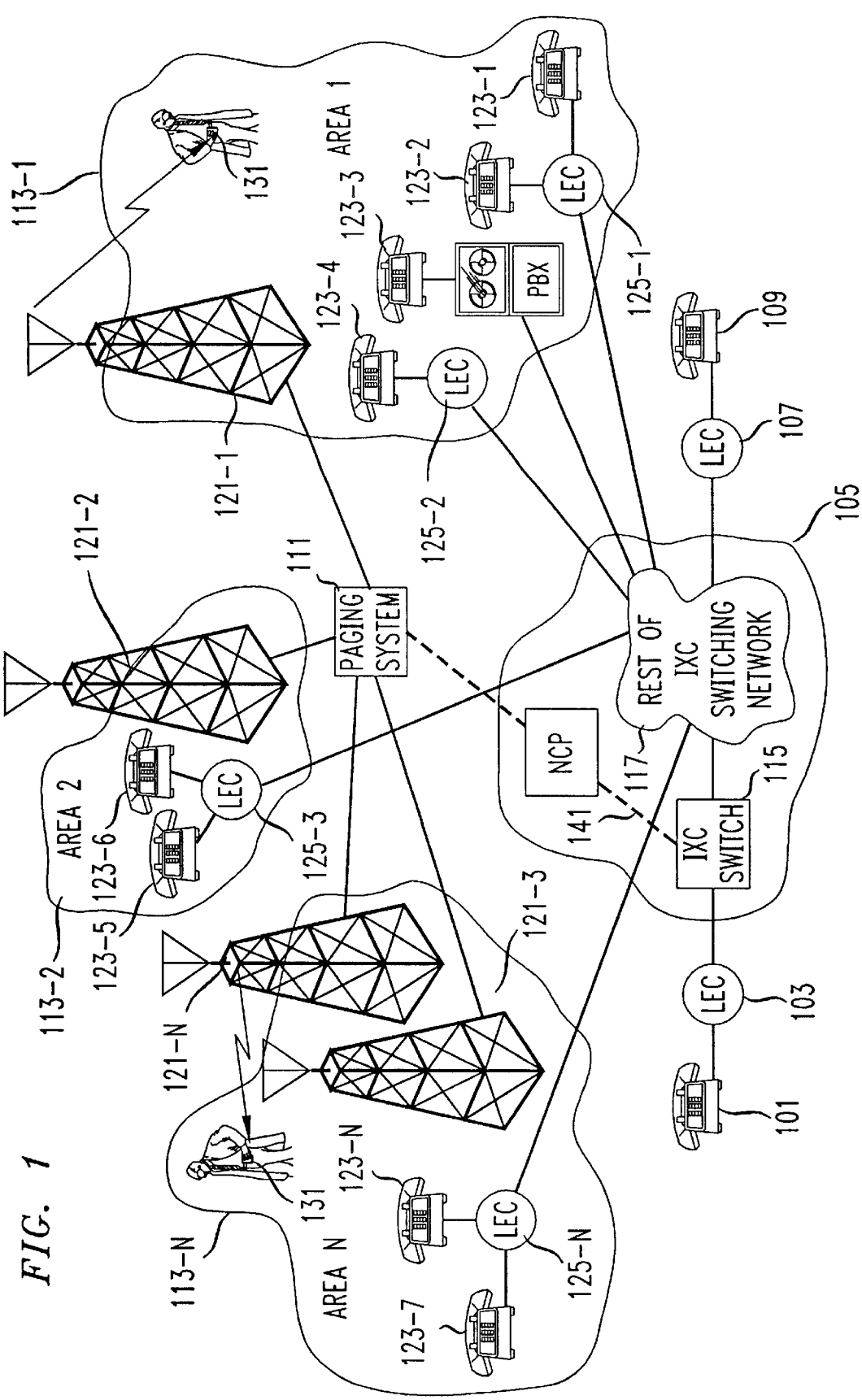
FIG. 1 shows an exemplary system for processing calls in response to a determination of the present location of the called party, in accordance with the principles of the invention.

FIG. 1 shows an exemplary system for processing of calls in response to a determination of the present location of the called party, in accordance with the principles of the invention. In particular, shown in FIG. 1 are (a) calling telephone 101, (b) local exchange carriers (LECs) 103 and 107, (c) inter-exchange carrier (IXC) network 105, (d) default destination telephone 109, (e) two-way paging system 111, and (f) paging areas 113, which include paging areas 113-1 through 113-N. IXC network 105 includes (1) IXC switch 115, (2) rest of IXC switching network 117, and (3) a data base, e.g., the well known network control point (NCP) 119. Each of paging areas 113 includes (i) at least one of paging antennas 121, which include paging antennas 121-1 through 121-N, (ii) at least two of potential destination telephones 123, which include potential destination telephones 123-1 through 123-N, and (iii) at least one of LECs 125, which include LEC 125-1 through 125-N.

According to the invention, a caller at telephone 101 places a telephone call to a translatable telephone number of the called party, typically, a personal telephone number. As is well known in the art, a translatable telephone number is a telephone number for which a database lookup must be performed to determine the routing telephone number to which the call is actually completed. Exemplary translatable telephone numbers include 500-, 700-, 800-, and 900-types of telephone numbers. LEC 103 receives the call and recognizes from the dialed number that the call is to be carried by IXC network 105. Therefore, LEC 103 routes the call to IXC switch 115, which is the originating switch within IXC network 105 for the call.

IXC switch 115 recognizes that the dialed number is a translatable telephone number and, therefore, IXC switch 115 requests routing instructions for the call in the conventional manner from NCP 119, e.g., via data connection 141. Such data connections are typically implemented via a signaling network, e.g., the well known signaling system 7 (SS7) network. NCP 119 receives the request for routing instructions from IXC switch 115. The request for routing instructions includes the dialed telephone number. From the dialed telephone number, NCP 119 determines that the called party is a subscriber to a service in which calls are routed to a particular one of potential destination telephones 123 based upon in which of areas 113 the called party is presently located, in accordance with the principles of the invention. We call this service the "location redirection via two-way paging"service. Therefore, in accordance with an aspect of the invention, NCP 119 determines in which one of areas 113, if any, the called party is presently located.

At any given time, the one of areas 113, if any, in which the called party is located may be determined by signaling the called parties' two-way paging device 131 to determine the location of the two-way pager from its response. Such signaling is not that which is typically known in the art as a page, because the signal is not designed to result in an alert of any type at the called parties' two-way paging device 131. The location of two-way paging device 131 is determined by, for example, which of the one of antennas 121 receives the strongest response from two-way paging device 131.

The signaling for a particular party may be undertaken by two-way paging system 111 in response to a request from NCP 119 for the current one of areas 113, if any, in which the called party is presently located. The resulting location is then transmitted from paging system 111 to NCP 119 upon its determination. Another way by which may be determined the one of areas 113, if any, in which the called party is presently located is for paging system 111 to transmit, on its own, the particular area 113 in which the called party is located to NCP 119 each time two-way paging system 111 determines that the called party has changed areas 113. Thus, the current location information is constantly updated and stored in NCP 119. A third way in which the present location of the called party may be determined is for two-way paging system 111 to store, and continually update as it changes, the present location of the called party and to provide the stored information to NCP 119 in response to a particular request therefrom.

In accordance with the principles of the invention, NCP 119 determines if there are routing instructions stored for processing calls placed to the called party when the called party is within the particular area 113 that was identified as the area 113 in which the called party is currently located. Typically, in accordance with an aspect of the invention, such routing instructions specify to complete the call to at least one of potential destination telephones 123 within the one of areas 113 in which the called party is located. However, in accordance with an aspect of the invention, the routing instructions may also specify (a) a particular one of potential destination telephones 123 outside of the one of areas 113 in which the called party is located, (b) routing the call to a particular wireless telephone, (c) routing the call to a telephone not within any of areas 113, (d) routing the call to a sequence of wired and/or wireless telephones within or outside of the area until the call is answered, and (e) routing the call to a conventional automated answering platform (not shown), e.g., voice mail. If there are routing instructions stored in association with the called telephone number and the determined area, NCP 119 returns the routing instructions to IXC switch 115. IXC switch 115 then uses the routing instructions to route the call in the conventional manner. For example, the call may be routed through rest of IXC switching network 117 and LEC 125-3 to potential destination telephone 123-4 when the called party is located within area 113-2.

If there are no routing instructions stored in association with the called telephone number and the area 113 in which the called party is located, NCP 119 retrieves default routing instructions for the called party and routes the call in the conventional manner as provided by the default routing instructions. For example, the call may be routed through rest of IXC switching network 117 and LEC 107 to default destination telephone 109.

Figure 2:
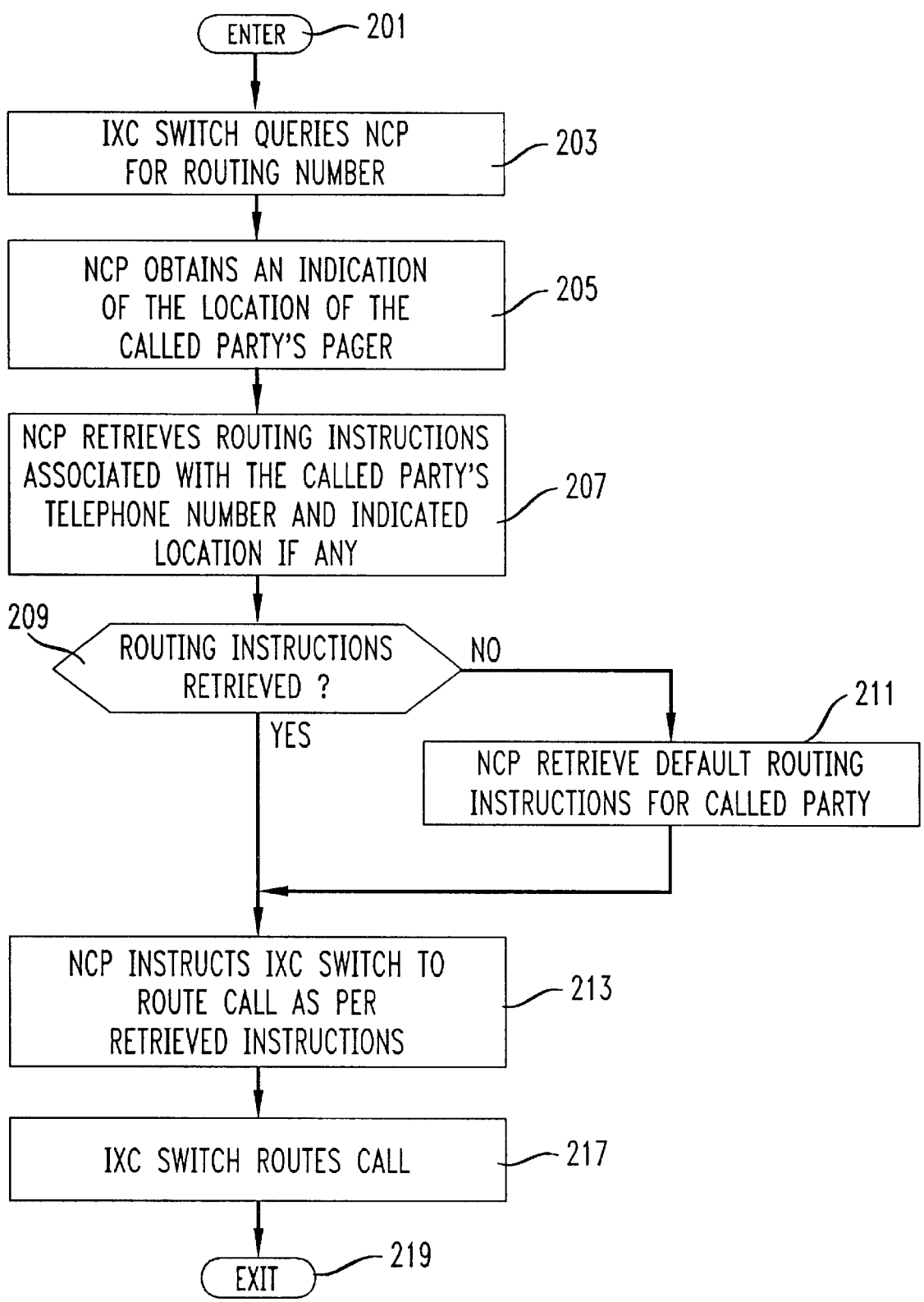
FIG. 2 shows an exemplary process for providing the location redirection via two-way paging service in accordance with the principles of the invention.

FIG. 2 shows an exemplary process for providing the location redirection via two-way paging service in accordance with the principles of the invention. The process is entered in step 201, when a caller's call to the translatable telephone number of a called party subscribing to the location redirection via two-way paging service is received at originating IXC switch 115. In step 203, originating IXC switch 115 queries NCP 119 for a routing telephone number.

Control then passes to step 205, in which NCP 119 recognizes that the call was placed to a subscriber of the location redirection via two-way paging service. Therefore, in accordance with the principles of the invention, NCP 119 obtains an indication of the location of the called party's two-way pager, e.g., NCP 119 determines in which of areas 113 the called party is currently located. Next, in step 207, in accordance with the principles of the invention, NCP 119 retrieves particular routing instructions that were prestored therein by, or on behalf of, the called party and are associated with both (a) the called party's telephone number and (b) the indicated current location of the called party, if any.

Conditional branch point 209 tests to determine if any routing instructions were retrieved. If the test result in step 209 is NO, control passes to step 211, in which NCP 119 retrieves the default routing instructions for the called party. If the test result in step 209 is YES, or after execution of step 211, control passes to step 213, in which NCP 119 instructs IXC switch 115 to route the call as per the retrieved instructions, in accordance with the principles of the invention. In step 217, IXC switch 115 routes the call as instructed. The process then exits in step 219.

TABLE 1

| Personal Telephone Number | Tower ID | Routing 1 | Routing 2 | Routing 3 |
|---|---|---|---|---|
| 500-555-3001 | 121-1, 121-3, 121-5 121-67, 121-68, 121-70 default | 123-3 123-12 123-1 | 123-2 123-13 | 123-5 |
| 800-555-3179 | 121-45, 121-46, 121-47 121-1, 121-3, 121-5 default | 123-67 123-8 123-5 | 123-68 123-9 | 123-69 123-5 |
| 800-555-2106 | 121-17 default | 123-32 123-44 | 123-62 | |

Table 1 shows an exemplary location dependent routing instructions table. The addressing scheme of Table 1 corresponds to that employed in FIG. 1. Note that some of the entries of Table 1 are not actually shown in FIG. 1. In a real location dependent routing instructions table the actual, or appropriately mapped translatable, addresses of the paging antennas 121 would be used to populate Tower Identification (ID) column while telephone numbers, or appropriate tags, would be used to populate the routing columns.

The information to populate Table 1 is specified by the called party. The information may be entered on behalf of the called party or it may be obtained directly from the called by having each called party administer is own personal telephone number. As an example of the latter, the called party may be supplied with an administration telephone number which, when called, prompts the called party to enter the necessary information. The destinations specified in routing 1, routing 2, and routing 3 are tried in sequence, until the call is answered or abandoned, when a call is placed to the telephone number listed in the personal telephone number column. The particular sequence, i.e., the particular row, used is determined by the row of Table 1 in which is listed the identity of the particular tower presently serving the called party in the Tower ID column for the called personal telephone number.

It is noted that the call treatments associated with any particular location may be time dependent. For example, for a call placed to the personal telephone number of a called party during a first particular time period, the determination that the called party is located within a particular area causes a routing instruction to be retrieved that indicates the call is to be completed to a first one of potential destination telephones 123, while during a second particular time period, the determination that the called party is located within the particular area a routing instruction to be retrieved that indicates the call is to be completed to a second one of potential destination telephones 123. Advantageously, in the morning, a commuter on his way to work who is determined to be in a particular one of areas 113 between his home and his office can have his calls routed to his office while in the evening, on his way home from work, when he is determined to be in the same particular one of areas 113, he can have his calls routed to his house. Thus, if messages are left by the calling party at the location to which the call is completed, e.g., on a conventional answering machine, the called party will be able to receive the messages when he arrives at the location to which he is traveling.

In addition to processing the call according to the routing instructions associated with the one of areas 113 in which the called party is located, a page may be transmitted to the called party's two-way paging device 131 indicating an identifier of the calling party, such as, a) the automatic number identification (ANI) of the calling party, b) a personal identification number (PIN) that was given to the caller, or c) alphanumeric characters, e.g., the caller's name. Also, an indication of the telephone to which the call is being routed can be supplied to the called party as part of the paging information, e.g., the telephone number of the destination telephone or a location indicator such as "home phone", "office phone", "parent's phone", or "friend's phone". One way in which such names can be determined is if the locations to which a call may be routed are administered using predefined tags, e.g., text-to-speech mnemonic audible tags.

In another embodiment of the invention, the location of the called party is determined from a global positioning system (GPS) receiver which is connected to, or incorporated in, the two-way pager associated with the called party. The areas would be defined by GPS coordinates rather than by paging tower location. Thus, the areas may be defined independent of the location of the paging towers.

Although the invention is described in terms of a two-way paging device, it will be readily apparent to those skilled in the art that any two-way wireless communications device that is only served by one wireless communication source, e.g., an antenna or tower, at any particular time may be used to identify the location of the called party.

Also, although NCP 119 is shown as part of IXC network 105, it will be appreciated that a data base associating locations with call treatments, for purposes of the invention, may be placed at other locations provided it is connected to the telephone system to deliver instructions on how to route calls.

While originating telephone 101 and LEC 103 are shown as not being within any of areas 113, this is for clarity of exposition only. Actually, any of potential destination telephones 123 may be the originating telephone.

The information used to associate a called party's telephone number, routing instructions, and any of areas 113 may be collected using any conventional data entry method, e.g., entry at a computer console or specification via dual tone multi-frequency (DTMF) signals.

It is noted that, although the invention has been described in terms of two-way pagers, any apparatus that can identify the one of the areas in which the called party is located may be used.

The foregoing merely illustrates the principles of the invention. It will thus be appreciated that those skilled in the art will be able to devise various arrangements which, although not explicitly described or shown herein, embody the principles of the invention and are thus within its spirit and scope.

The invention claimed is:

1. A method for routing a telephone call to a called party associated with a called telephone number, based on the location of the called party, said method comprising the steps of:

receiving a telephone call for said called party;

then determining within which of a plurality of predefined areas said called party is likely to be located;

then retrieving from a database a call treatment entry associated with the area determined by the step of determining and with the called party, where the database contains a set of call treatment entries for the called party, where each entry associates a call treatment specification with one of said predefined areas and where the call treatment specification of the entry of at least one of the predefined areas includes an instruction to route calls to a device in the area found by the step of determining having a telephone number other than the called telephone number; and then processing said call according to said retrieved call treatment specification.

2. The method as defined in claim 1 further including the step of:

obtaining information defining a default call treatment for said called party when the step of retrieving fails to retrieve a call treatment entry for said call party; and assigning the default call treatment as the retrieved call treatment.

3. The method as defined in claim 1 wherein said storing step includes the step of receiving from said called party said information for establishing said associations.

4. The method as defined in claim 1 wherein said retrieved call treatment is to route said received telephone call to a telephone located outside of said determined area in said determining step, to a landline telephone located in the area, or to a particular wireless telephone.

5. The method as defined in claim 1 further including the step of routing said call over a telephone line of an interexchange carrier as part of said step of processing.

6. The method as defined in claim 1 further including the step of transmitting an indication of the current call treatment to said called party.

7. The method as defined in claim 1 further including the step of transmitting an indication of the identity of said calling party to said called party.

8. The method as defined in claim I wherein said call treatment is the routing of said call to a sequence of destinations until the call is answered or abandoned.

9. The method as defined in claim 1 wherein said call treatment is time dependent.

10. The method as defined in claim 1 further including the step of storing information for said called party defining said areas in terms of global positioning system coordinates, and wherein said determining step includes the step of comparing global positioning signals supplied for said called party against said information defining said area supplied by said called party.

11. The method as defined in claim 1 further including the step of storing information for said called party defining said areas in terms of paging tower antennas, and wherein said determining step includes the step of comparing the one of said paging tower antennas identified as receiving a signal from a two-way paging tower antenna against said information defining said areas supplied by said called party.

12. A method for use in establishing a telephone call, said method comprising the steps of:

receiving a call for a called party at a switch of a telephone network, said call being placed to a telephone number having an attribute that defines it as a translatable number (translatable telephone number);

requesting routing instructions for said call, by said switch, from a network control point when it is determined by said switch that said call is being placed to a translatable telephone number;

requesting by said network control point, from a two-way paging system, the particular area, served by at least two telephones, in which a two-way paging device associated with said called party when it is determined by said network control point that said call is being placed to a translatable telephone number that is subscribed to a two-way paging redirection service;

receiving at said network control point the requested particular area;

retrieving information stored in said network control point on behalf of said called party that associates a call treatment with said particular area;

transmitting from said network control point instructions corresponding to said call treatment associated with said particular area to said switch routing;

receiving said routing instructions at said switch; and routing said call according to said received routing instructions.

13. The method as defined in claim 12 further including the step of:

receiving from said called party information associating a call treatment with an identifiable location; and storing said information in said network control point.

14. The method as defined in claim 12, wherein said routing step includes the step of carrying said call over a telephone line of an interexchange carrier.

15. Apparatus for routing a telephone called placed to a number associated with a called party, based on the likely location of the called party, said apparatus comprising:

a memory containing call treatment entries for the called party, where each entry associates a call treatment specification with a predefined area and where the call treatment specification of the entry of at least some of the predefined areas includes an instruction to route the call to a telephone in the predefined area having a number other than the number;

means for receiving a telephone call for said called party;

means for determining within which of said areas, if any, said called party is likely to be located;

means for retrieving said defined call treatments stored in associated with said determined area, if any, for said called party; and means for initiating the processing of said call according to said retrieved defined call treatment if a call treatment is retrieved in said retrieving step.

16. The apparatus as defined in claim 15 further including a telephone line over which said call is routed in response to said call treatment initiated by said means for initiating.

17. The apparatus as defined in claim 15 wherein said means for determining comprises a data base.

18. The apparatus as defined in claim 17 wherein said data base is stored in an interexchange carrier.

19. The apparatus as defined in claim 17 wherein said data base is stored in the network of a two-way paging provider.

20. The apparatus as defined in claim 15 further including means for storing information for said called party defining said areas in terms of global positioning system coordinates, and wherein said determining means includes means for comparing global positioning signals supplied for said called party against said information defining said areas supplied by said called party.

21. The apparatus as defined in claim 15 wherein said means for determining includes means for receiving information from a two-way paging network indicating the antenna to which said called party is in closest proximity.

22. The apparatus as defined in claim 21 wherein said two-way paging network transmits said information upon a change of the antenna to which said called party is in closest proximity.

23. The apparatus as defined in claim 21 wherein said two-way paging network transmits said information upon a request for said information.

24. The apparatus as defined in claim 21 wherein said two-way paging network transmits said information every time said paging network determines in which of said areas, if any, said called party is located.

25. The apparatus as defined in claim 21 wherein said two-way paging network transmits said information periodically.

26. The apparatus as defined in claim 15 wherein said means for determining includes means for initiating a page to a two-way paging device of said called party.

27. The apparatus as defined in claim 26 wherein said means for determining includes means for receiving any response from said called party's two-way paging device.

28. Apparatus for use in a telephone system made up of at least two interlinked telephone networks to complete a caller's telephone call made to a number associated with a called party at one of a plurality of geographically dispersed telephones each having a number other than said number associated with the called party, some of said telephones being grouped into at least two service areas, each of said service areas having (i) at least two of said telephones and (ii) a two-way paging receiver that communicates information with a paging coordinating system over communication facilities that are independent of the links connecting said telephones to said telephone system, said apparatus comprising:

means for receiving and holding said telephone call;

means for obtaining from said paging coordinating system the one of said areas in which a pager of said called party is located;

means for determining a call treatment specified by said called party for processing calls when said called party is located within said obtained area; and means for processing said call according to said determined call treatment.

29. A method for routing a telephone call to a party having an associated telephone number, based on the likely location of the called party, said method comprising the steps of:

storing information supplied by said called party to establish associations between: (i) predefined areas, each of said areas being served by telephones, and (ii) information defining call treatments, which information, at least for some of said areas, includes an instruction to route the call to one of the telephones in the area having a telephone number other than said associated telephone number;

then receiving a telephone call for said called party;

then determining within which of said areas, if any, said called party is likely to be located;

then retrieving, using said stored information establishing associations, call treatment information that is stored in association with said determined area, if any, for said called party; and then initiating the processing of said call according to said call treatment defined by said retrieved call treatment information when call treatment information is retrieved in said retrieving step.

* * * * *

UNITED STATES PATENT AND TRADEMARK OFFICE
CERTIFICATE OF CORRECTION

PATENT NO.    : 6,603,973 B1
DATED         : August 5, 2003
INVENTOR(S)   : Mark Foladare et al.

It is certified that error appears in the above-identified patent and that said Letters Patent is hereby corrected as shown below:

Column 6,
Lines 34-38, should read:
-- 1. A method for routing a telephone call comprising the steps of:
    receiving a telephone call directed to a number that is assigned to a party rather than assigned to a mobile instrument or a fixed terminating point of a telecommunication network; --

Column 10,
Lines 5-6, "associated telephone number" should read -- associated landline telephone number --

Signed and Sealed this

Twentieth Day of January, 2004

JON W. DUDAS
*Acting Director of the United States Patent and Trademark Office*